S. Stout,
Churn Dasher.
No. 113,361. Patented Apr. 4, 1871.
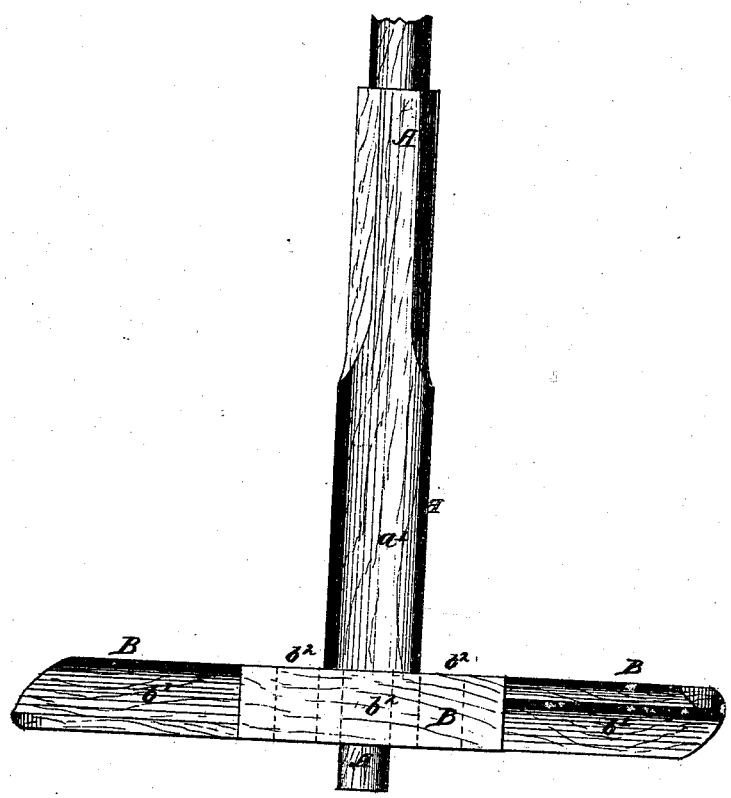
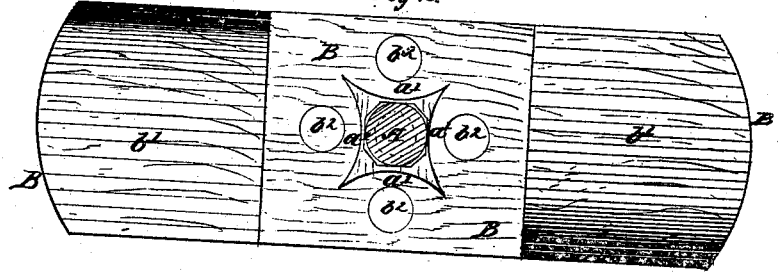
Witnesses:
P. C. Dieterich
W. H. C. Smith
Inventor:
S. Stout.
per
Attorneys.

United States Patent Office.

STEPHEN STOUT, OF TREMONT, ILLINOIS.

Letters Patent No. 113,361, dated April 4, 1871.

IMPROVEMENT IN CHURN-DASHERS.

The Schedule referred to in these Letters Patent and making part of the same.

*To all whom it may concern:*

Be it known that I, STEPHEN STOUT, of Tremont, in the county of Tazewell and State of Illinois, have invented a new and useful Improvement in Churn-Dasher; and I do hereby declare that the following is a full, clear, and exact description thereof, which will enable others skilled in the art to make and use the same, reference being had to the accompanying drawing forming part of this specification, in which—

Figure 1 is a side view of my improved churn-dasher.

Figure 2 is a top view of the same.

Similar letters of reference indicate corresponding parts.

My invention has for its object to furnish an improved churn-dasher, simple in construction and effective in operation, bringing the butter in a very short time, and gathering it, when brought, quickly into a mass; and It consists in the construction and combination of various parts of the dasher, as hereinafter more fully described.

A is the dasher-handle, to the lower end of which is attached the dasher B.

The handle A, for a greater or lesser distance, as may be desired, above the dasher B, is concaved upon its four sides, $a'$, as shown in figs. 1 and 2. The middle part of the dasher B, to the center of which the lower end of the handle A is attached, is made square.

The ends or wings $b'$ of the dasher B are inclined laterally, and have their lower edges beveled off, as shown in figs. 1 and 2.

Through the square middle part of the dasher B are formed four holes, $b^2$, one hole being directly opposite each concave side $a'$ of the handle A, as shown in fig. 2.

By this construction of the dasher and handle the butter will be brought quickly and thoroughly, and will be quickly gathered, the concavities $a'$ of the handle and the holes in the dasher at the same time serving to introduce air into the lower part of the churn, to be forced through the milk by the dasher.

The construction of the wings of the dasher causes a large quantity of milk to be gathered beneath the forward parts of the said wings, to be forced out through the narrower spaces beneath their rear edges, thus making the dasher more efficient.

Having thus described my invention,

I claim as new and desire to secure by Letters Patent—

An improved churn-dasher, formed by the combination of the handle A $a'$ and dasher B $b^1$ $b^2$ with each other, substantially as herein shown and described, said parts being constructed and operating as and for the purposes set forth.

STEPHEN STOUT.

Witnesses:
   H. B. SMITH,
   W. M. LUCAS.